US007416007B2

(12) United States Patent
Caretta et al.

(10) Patent No.: US 7,416,007 B2
(45) **Date of Patent: *Aug. 26, 2008**

(54) TYRE FOR A VEHICLE WHEEL

(75) Inventors: Renato Caretta, Gallarate (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/984,226

(22) Filed: Nov. 9, 2004

(65) Prior Publication Data

US 2005/0081977 A1 Apr. 21, 2005

Related U.S. Application Data

(60) Division of application No. 09/885,092, filed on Jun. 21, 2001, now Pat. No. 6,972,063, which is a continuation of application No. PCT/EP99/09389, filed on Dec. 1, 1999.

(60) Provisional application No. 60/118,527, filed on Feb. 2, 1999.

(30) Foreign Application Priority Data

Dec. 23, 1998 (EP) ................................ 98830778

(51) Int. Cl.
*B60C 9/02* (2006.01)
*B60C 15/00* (2006.01)

(52) U.S. Cl. ........................ 152/548; 152/539; 152/540

(58) Field of Classification Search ....................... None
See application file for complete search history.

(56) References Cited

U.S. PATENT DOCUMENTS 1,728,957 A 9/1929 Dickinson
1,930,764 A 10/1933 Mallory (Continued)

FOREIGN PATENT DOCUMENTS

EP 0664231 A1 7/1995

(Continued)

OTHER PUBLICATIONS

U.S. Appl. No. 09/364,099, filed Jul. 30, 1999, Applicant—Carretta.

*Primary Examiner*—Justin Fischer
(74) *Attorney, Agent, or Firm*—Finnegan, Henderson, Farabow, Garrett & Dunner, L.L.P.

(57) ABSTRACT

A tyre for a vehicle wheel includes a carcass structure, belt structure, tread band, and at least one pair of sidewalls. The carcass structure includes at least one first carcass ply and at least two annular reinforcing structures. The at least one first carcass ply includes elongated sections circumferentially distributed around the tyre's geometric rotation axis. Each elongated section extends in a U-shaped configuration around a cross-section outline of the carcass structure to define two side portions and one crown portion. Each elongated section substantially lies in a plane parallelly offset relative to a meridian plane of the carcass structure. The crown portion of each elongated section is oriented, relative to a radial reference plane passing through a transition region between the crown portion and at least one corresponding side portion, at an angle having a different value from an inclination of the at least one corresponding side portion.

13 Claims, 9 Drawing Sheets

U.S. PATENT DOCUMENTS 3,072,171 A 1/1963 Drakeford et al.
3,240,250 A 3/1966 Frazier
4,248,287 A 2/1981 Christman
5,362,343 A 11/1994 Debroche
5,453,140 A 9/1995 Laurent et al.
5,702,548 A 12/1997 Arnaud et al.
5,705,007 A 1/1998 Bohm et al.
6,318,432 B1 11/2001 Caretta et al.
6,328,084 B1 12/2001 Caretta et al.
6,457,504 B1 10/2002 Caretta
6,623,584 B2 9/2003 Caretta
6,763,868 B1 7/2004 Caretta
6,783,619 B2 8/2004 Caretta
6,814,119 B2 * 11/2004 Caretta et al. ............... 152/517
7,025,846 B2 * 4/2006 Caretta .................... 156/110.1
2001/0023737 A1 9/2001 Caretta et al.
2002/0011297 A1 1/2002 Caretta et al.
2002/0029841 A1 3/2002 Caretta et al.
2002/0056498 A1 5/2002 Caretta et al.
2002/0189737 A1 12/2002 Caretta

FOREIGN PATENT DOCUMENTS

FR 0384231 4/1908
JP 60-157840 8/1985

* cited by examiner

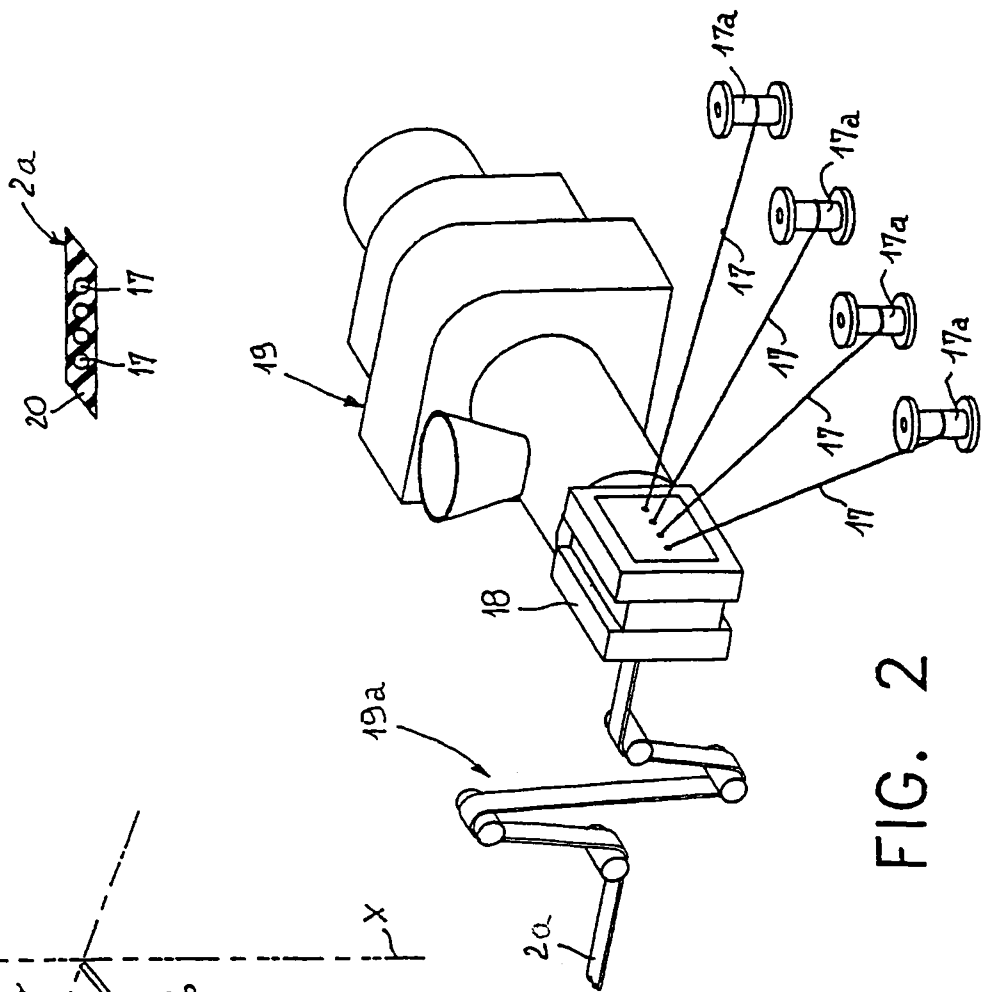
FIG. 3
2a
17
17
20
19
17a
17a
17a
17a
17
17
17
17
18
19a
20
FIG. 2
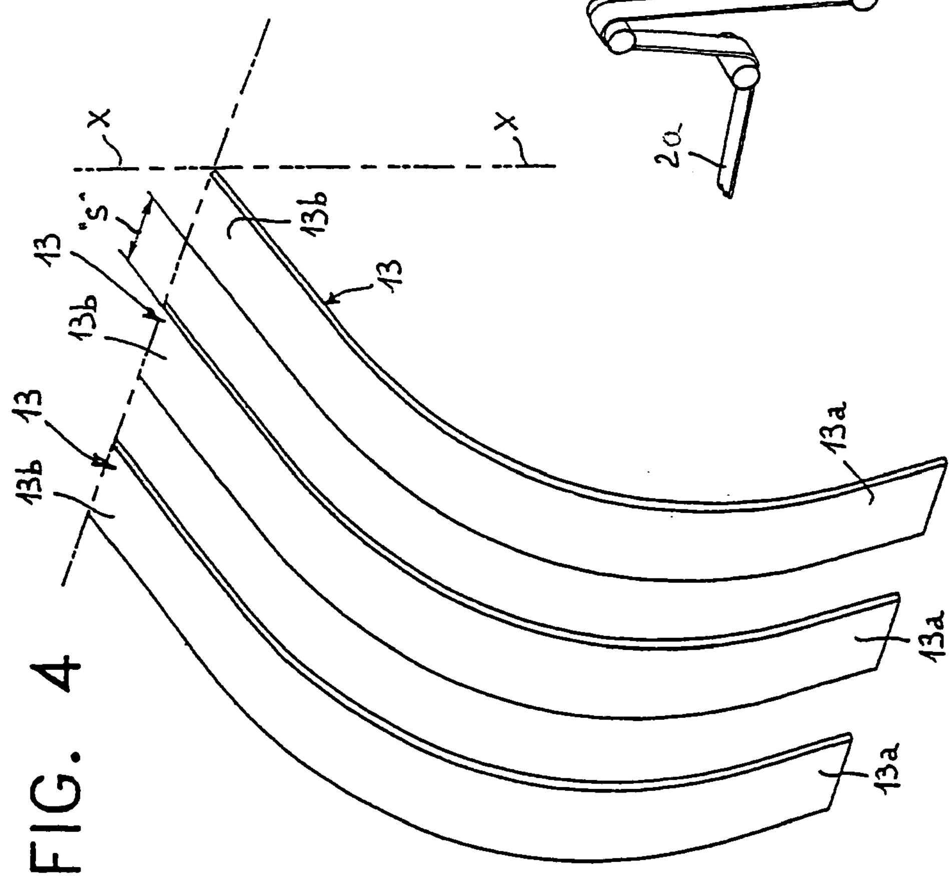
X
X
"S"
13
13
13
13b
13b
13b
13a
13a
13a
FIG. 4

FIG. 8
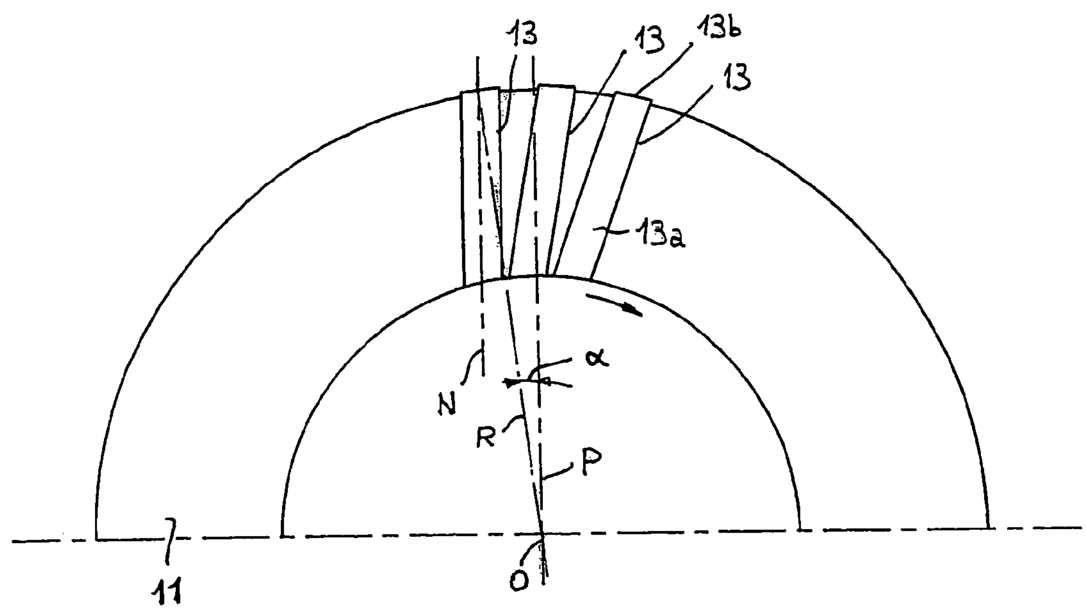
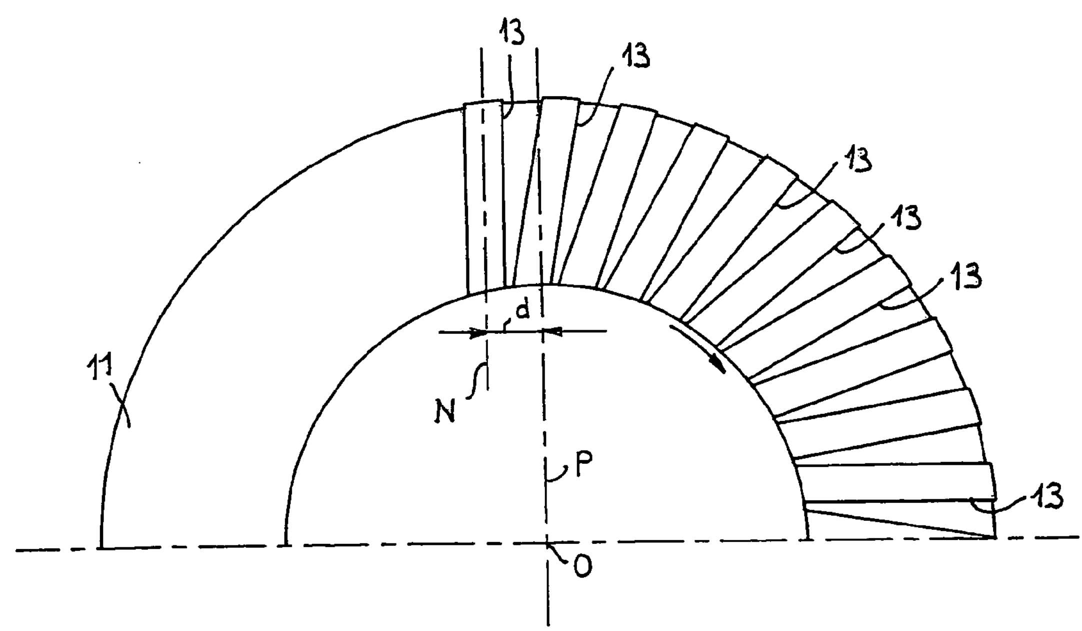
FIG. 9

FIG. 10
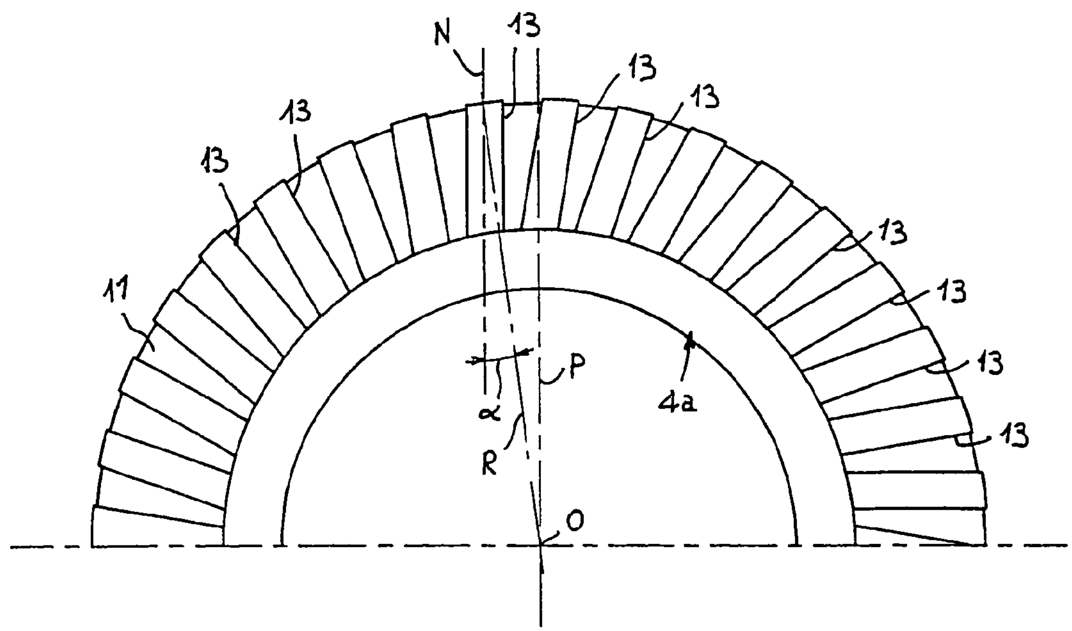
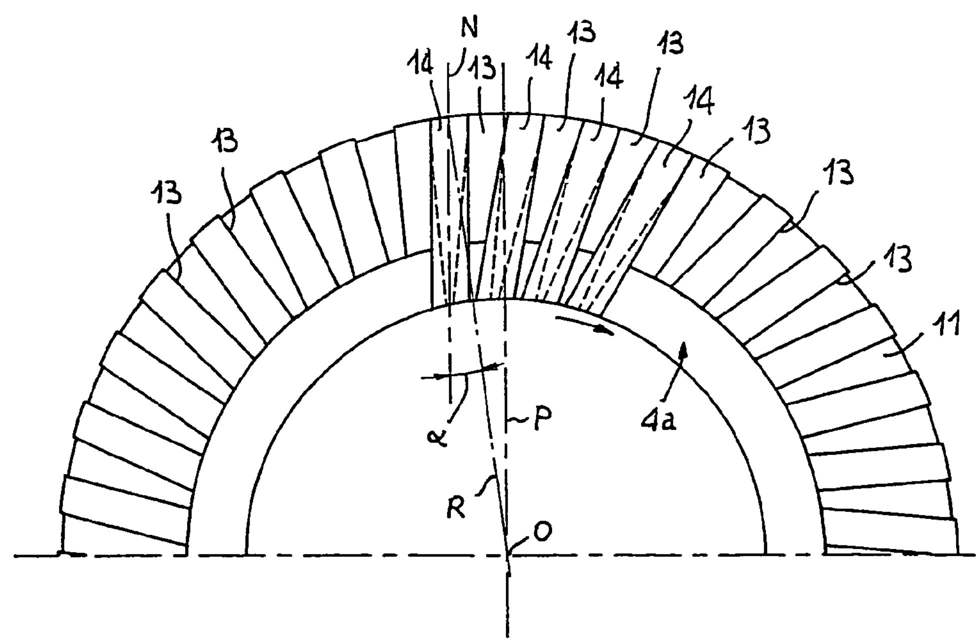
FIG. 11

FIG. 12
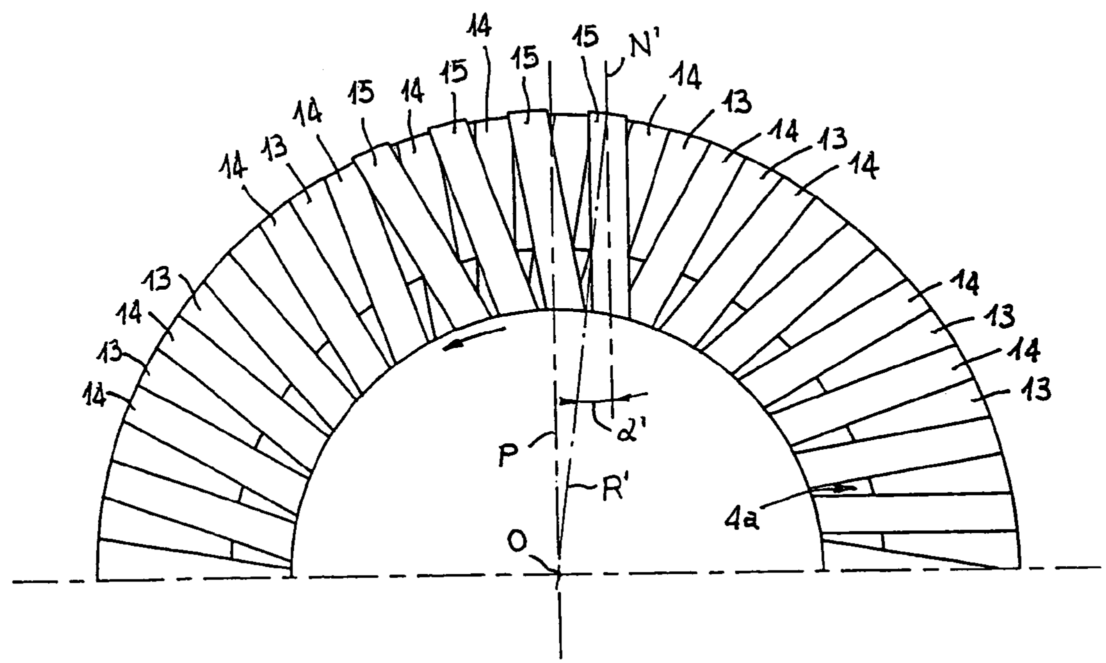
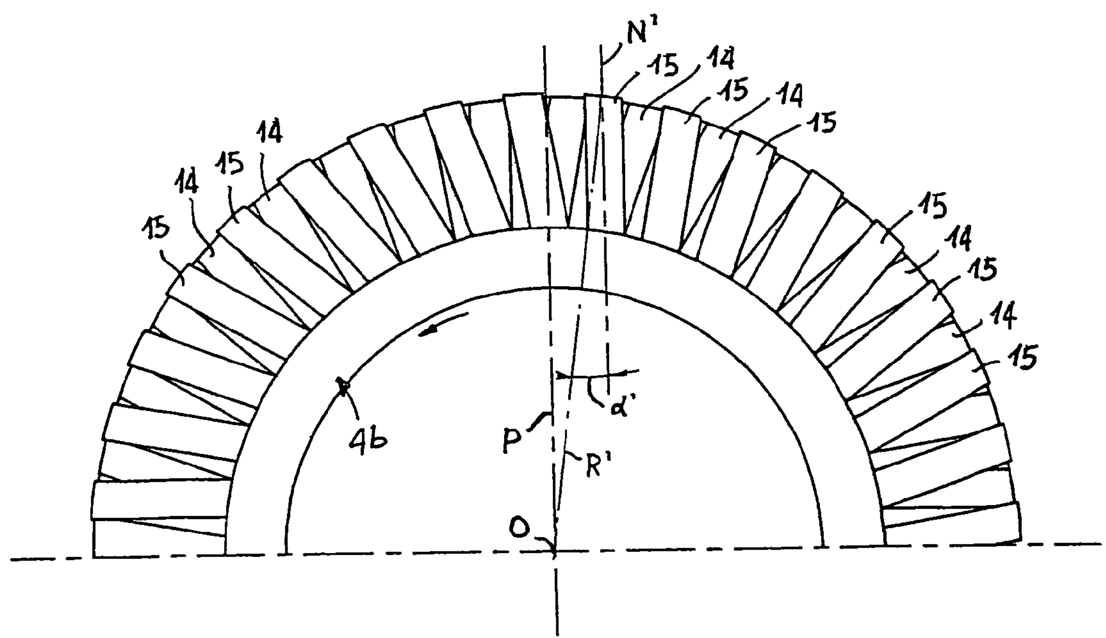
FIG. 13

FIG. 14
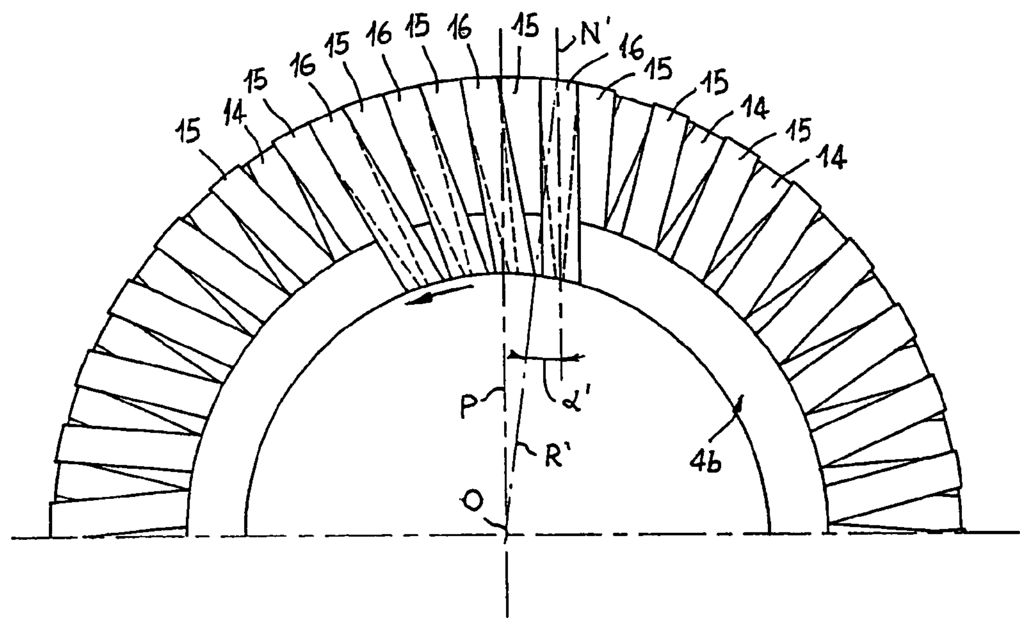
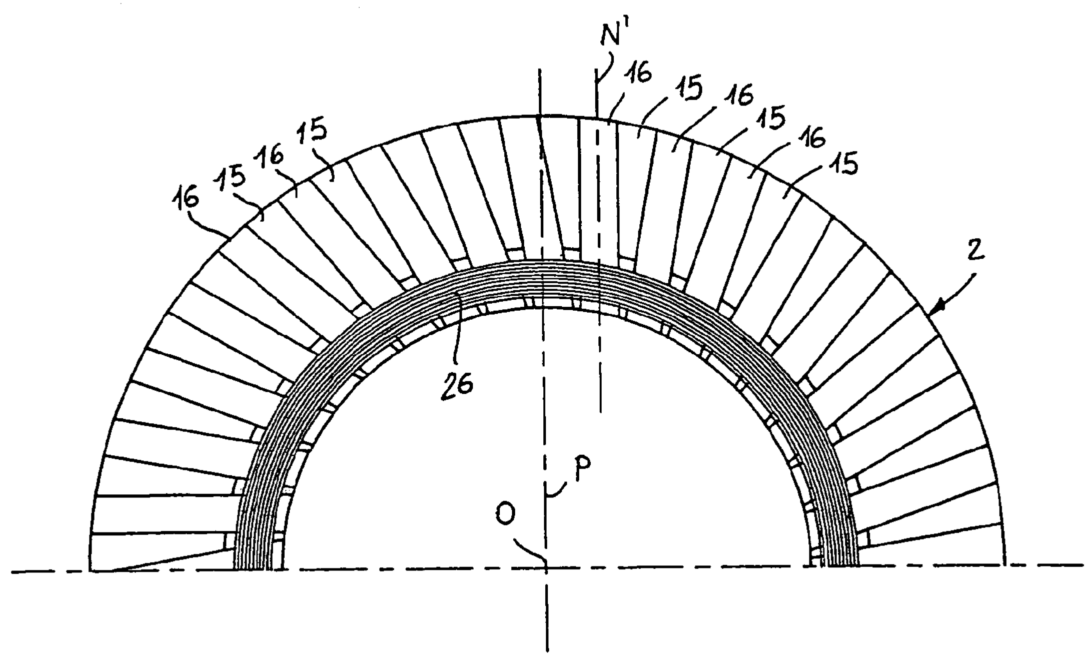
FIG. 15

TYRE FOR A VEHICLE WHEEL

CROSS-REFERENCE TO RELATED APPLICATIONS

This application is a divisional application of U.S. patent application Ser. No. 09/885,092, filed Jun. 21, 2001 now U.S. Pat. No. 6,972,063, which is a continuation of International Patent Application No. PCT/EP99/09389, filed Dec. 1, 1999, in the European Patent Office; additionally, Applicants claim the right of priority under 35 U.S.C. § 119(a) - (d) based on patent application Ser. No. 98830778.1, filed Dec. 23, 1998, in the European Patent Office; further, Applicants claim the benefit under 35 U.S.C. § 119(e) based on prior-filed, copending provisional application No. 60/118,527, filed Feb. 2, 1999, in the U.S. Patent and Trademark Office; the contents of all of which are relied upon and incorporated herein by reference.

BACKGROUND OF THE INVENTION

1. Field of the Invention

The present invention relates to a method of manufacturing a carcass structure for vehicle wheel tyres, comprising the steps of: making at least one carcass ply by deposition of elongated sections circumferentially distributed on a toroidal support, each of said elongated sections extending in a U-shaped configuration around the cross-section outline of the toroidal support, to define two side portions mutually spaced apart in an axial direction, and one crown portion extending at a radially outer position between the side portions; applying annular reinforcing structures to a region close to the inner circumferential edges of said at least one carcass ply.

The present invention also relates to a carcass structure for vehicle wheel tyres to be obtained by the above method, said carcass structure comprising: at least one carcass ply comprising elongated sections circumferentially distributed around a geometric rotation axis, each of said elongated sections extending in a U-shaped configuration around the cross-section outline of the carcass structure, to define two side portions mutually spaced apart in an axial direction, and one crown portion extending at a radially outer position between the side portions; at least two annular reinforcing structures located close to respective inner circumferential edges of said at least one carcass ply.

2. Description of the Related Art

Manufacture of tyres for vehicle wheels involves formation of a carcass structure essentially consisting of one or more carcass plies substantially shaped in a toroidal configuration and having their axially-opposite side edges in engagement with respective annular circumferentially-inextensible reinforcing elements, usually referred to as “bead cores”.

Applied to the carcass structure, at a circumferentially outer position, is a belt structure comprising one or more belt strips in the form of a closed ring, essentially made up of textile or metallic cords suitably oriented with respect to each other and the cords belonging to the adjacent carcass plies.

Then a tread band usually consisting of a strip of elastomer material of appropriate thickness is applied to the belt structure at a circumferentially external position thereof.

It is to point out that, to the aims of the present invention, by the term “elastomer material” it is intended a rubber blend in its entirety, that is the assembly made up of at least one base polymer suitably amalgamated with reinforcing fillers and/or process additives of various types.

Finally, to the opposite sides of the tyre being manufactured a pair of sidewalls are applied, each of them covering a side portion of the tyre included between a so-called shoulder region, located close to the corresponding side edge, of the tread band, and a so-called bead located at the corresponding bead core.

In accordance with traditional production methods, essentially the above listed tyre components are first made separately from each other, to be then assembled during a tyre-manufacturing step.

For instance, for making the carcass ply or plies to be associated with the bead cores to form the carcass structure, production of a rubberized fabric comprising longitudinally-disposed continuous textile or metallic cords, through an extrusion and/or calendering process, is first required. This rubberized fabric is submitted to a transverse-cutting operation to produce lengths of predetermined sizes that are subsequently joined together so as to give rise to a continuous ribbon-like semifinished product having transversely-disposed parallel cords.

Then this article of manufacture is to be cut into sections the length of which is correlated with the circumferential extension of the carcass to be made.

Production methods have been also proposed which, instead of resorting to the production of semifinished products, make the carcass structure directly during the tyre-manufacturing step.

For instance, U.S. Pat. No. 5,453,140 herein quoted as an example of the most pertinent state of the art, discloses a method and an apparatus forming a carcass ply starting from a single cord previously wound around a reel.

According to the method and apparatus described in the above patent, at each operating cycle of the apparatus the cord drawn from the reel by power-driven idler rollers and maintained taut by a pneumatic tensioning system is cut to size to obtain a section of preestablished length.

The cord section is picked up by a pick-up element mounted on a belt looped around power-driven pulleys, to be then laid down transversely on the outer surface of a toroidal support.

The section ends are then engaged by bending members of the belt type operating on opposite sides of the toroidal support for radially applying the cord section to the toroidal support by means of slide elements acting like fingers along the side portions of the section.

Repetition of the above described operating cycle leads to deposition of a number of cord sections circumferentially disposed in side by side relationship until the whole circumferential extension of the toroidal support has been covered.

Necessarily, the toroidal support is previously coated with a layer of raw rubber having a dual function, i.e. that of adhering to the cords deposited thereon so as to conveniently hold them in a fixed positioning, and that of constituting an air-proof inner liner in the finished tyre.

Tyres obtained by this production method have a carcass structure in which the carcass ply or plies consist of individual cords each having two side portions axially spaced apart from each other and oriented radially of the rotation axis of the tyre, and one crown portion extending at a radially outer position between the side portions.

Within the scope of the carcass structure manufacture, it is also known that close to each of the tyre beads, the opposite ends of the individual cords forming a carcass ply are placed, in an alternating sequence, at axially opposite positions relative to an annular anchoring element constituting said bead core, made in the form of a crown consisting of thread coils radially superposed upon each other, as disclosed in Patent EP 0 664 231 and in U.S. Pat. No. 5,702,548.

In the above quoted art however, all cords forming the carcass ply or plies are substantially disposed along the neutral axis of resistance to bending of the respective bead. Under this circumstance, the structural strength of the beads must necessarily rely on the stiffness of the filling inserts of very hard elastomer material incorporated into the bead structure, the behaviour of which is affected by temperature changes due both to environmental factors and stresses produced during usual operation.

Proposed in Patent FR 384 231 is accomplishment of a carcass structure by deposition on a toroidal support of a series of rectangular bands of rubberized fabric circumferentially arranged close to each other and disposed in radial planes relative to the geometric axis of the support drum itself. Deposition of the bands is carried out in such a manner that the end flaps of two non-consecutive bands are partly covered with the end flaps of the band interposed between them. Spaces existing between the end flaps covered with the bands are occupied by trapezoidal inserts applied to the end flaps of the band overlapping the end flaps themselves. Deposition of the bands is carried out in different superposed layers, the number of which is correlated with the thickness to be given to the carcass structure. The presence of said trapezoidal inserts causes thickening of the carcass structure at the bead regions, so that a thickness which is twice that detectable at the crown is achieved.

In U.S. Pat. No. 4,248,287 a method is disclosed according to which for formation of the carcass structure it is provided that a plurality of layers each formed of radial strips made up of rubberized threads and circumferentially disposed in side by side relationship should be laid down on a toroidal drum. When deposition is completed, two bead cores are applied to the bead region and the end flaps of the carcass layers formed by the radial strips are turned up around them.

The Applicant has found that important advantages can be achieved both in terms of simplification of the production processes and in terms of improvement of the behavioural features of the tyre, if the carcass ply or plies are made by conveniently laying down strip-like sections on a toroidal support, each of said sections comprising a plurality of cords parallel to each other which are incorporated into an elastomer layer.

In this connection the Applicant has already developed different manufacturing methods being the object of respective European Patent Applications.

For instance, in European Patent Applications No. 97830731.2 and No. 97830733.8 a manufacturing method and a tyre are respectively described in which the carcass structure is obtained by making a first and a second carcass plies each obtained by strip-like sections laid down sequentially in mutual circumferential side by side relationship.

Tyres obtained in accordance with the description of these patent applications have the end portions of the strip-like sections belonging to the first and second carcass plies disposed on opposite sides respectively relative to the annular reinforcing structures of the bead.

This expedient, in combination with the respectively crossed orientation of the strip-like sections belonging to each of the plies offers important advantages in terms of structural strength of the tyre close to the beads and sidewalls.

In the European Patent Application No. 98830472.1 in the name of the same Applicant as well, accomplishment of a carcass ply is proposed which is made by laying down a first and a second series of strip-like sections in an alternating sequence, in which sections belonging to the first and second series terminate on respectively opposite sides relative to the reinforcing structures at the beads.

Thus, advantages can be achieved in terms of structural strength at the tyre beads and sidewalls even in the presence of a single carcass ply.

In the European Patent Application No. 98830662.7, still in the name of the same Applicant, the presence of two carcass plies each formed of two series of strip-like sections laid down in an alternating sequence is provided. The sections of each ply have a crossed orientation relative to those of the other ply and terminate at respectively opposite sides of a respective portion of the reinforcing structure at the bead, to give the tyre exceptional qualities in terms of mechanical resistance to stresses produced during the acceleration and deceleration steps, as well as during a slip running.

SUMMARY OF THE INVENTION

In accordance with the present invention, it has been found that in a carcass structure having one or more plies formed of elongated sections either in the form of a single cord or in the form of a strip made up of several parallel cords, it is advantageous for each section to be such disposed that its side portions are oriented with a given inclination relative to a direction radial to the rotation axis of the tyre, keeping the crown portion substantially oriented in a radial plane or at all events at any desired angle independently of the inclination of the side portions. This result can be conveniently achieved by laying down the elongated sections in planes that are conveniently offset relative to a meridian plane of the toroidal support.

Therefore, it is an object of the present invention to provide a method of manufacturing a carcass structure for vehicle tyres, characterized in that each of said sections is laid down substantially in a plane which is parallelly offset relative to a meridian plane of the toroidal support.

Advantageously, each of said sections can be laid down in a plane parallel to said meridian plane, in such a manner that each crown portion substantially lies in a reference plane radial to said geometric axis and passing through a transition point between the crown portion and the respective side portions, whereas said side portions extend each in an inclined direction relative to said reference plane.

In more detail, deposition of the elongated sections preferably takes place by the following steps: laying down a first series of elongated sections circumferentially distributed on said toroidal support; laying down a second series of elongated sections circumferentially distributed on said toroidal support.

In a possible embodiment, sections belonging respectively to the first and second series are laid down in offset deposition planes at respectively opposite sides relative to said meridian plane, so that the side portions of the sections respectively belonging to the first and second series have respectively crossed orientations.

It is preferably provided for the sections of the first series to be laid down at a circumferential pitch which is at least twice the width of each elongated section, the sections of the second series being laid down in the spaces existing between the sections belonging to the first series so as to define together with the latter said at least one carcass ply together with the last mentioned sections.

In more detail, the elongated sections are preferably laid down at a circumferential pitch corresponding to a multiple of their width, each of said sections being of a strip-like structure and comprising longitudinal and parallel thread-like elements at least partly covered with at least one layer of raw elastomer material.

It is also provided that during deposition, the crown portions of each section should be arranged consecutively in side by side relationship along the circumferential extension of the toroidal support, the side portions of each section being each partly covered with a side portion of at least one circumferentially adjacent section.

In a preferential solution of the invention, at least one first primary portion of each annular reinforcing structure is applied against the side portions of the sections belonging to the first series, before deposition of the sections belonging to the second series, the latter being laid down with their respective side portions overlapping the first primary portions on axially opposite sides relative to the side portions of the sections of the first series.

It is further preferably provided that after deposition of the sections belonging to the second series the following further steps should be carried out: laying down a third series of said elongated sections circumferentially distributed on the toroidal support; applying second primary portions of said annular reinforcing structures against the side portions of said elongated sections belonging to the third series, at axially opposite positions relative to the first primary portions; laying down a fourth series of said elongated sections circumferentially distributed on the toroidal support, the respective side portions thereof overlapping the second primary portions on axially opposite sides relative to the side portions of the sections of the third series.

Preferably, sections belonging to the first and third series as well are laid down at a circumferential pitch corresponding to a multiple of the width of the sections themselves, and sections belonging to the second and fourth series respectively are each laid down between two consecutive sections belonging to the first and third series respectively, so that the sections of the first and second series define a first carcass ply and the sections of the third and fourth series define a second carcass ply superposed on the first carcass ply.

Advantageously, sections belonging to the first and second series are laid down in a first deposition plane, and sections belonging to the third and fourth series are laid down in a second deposition plane, said first and second deposition planes being offset on respectively opposite sides with reference to said meridian plane, so that the side portions of the sections belonging to the first and second series have a crossed orientation relative to the side portions of the sections belonging to the third and fourth series.

It may be also conveniently carried out a further step of applying additional portions of the annular reinforcing structures to regions close to the circumferential inner edges of said at least one carcass ply, so that said at least one carcass ply is partly interposed between the second primary portion and the additional portion of the respective annular reinforcing structure.

In accordance with a further aspect of the invention, accomplishment of at least one primary portion of each annular reinforcing structure comprises the steps of: laying down at least one elongated element in concentric coils so as to form a circumferentially inextensible annular insert substantially having the shape of a crown; forming at least one filling body of elastomer material; joining the filling body to the first circumferentially inextensible annular insert.

Preferably, said elongated element is laid down directly against the end flaps of the elongated sections previously laid down on the toroidal support, so as to form said annular insert directly in contact against the elongated sections themselves, said filling body being formed by laying down a continuous strip of elastomer material directly against the previously formed annular insert.

It is also an object of the invention to provide a carcass structure for vehicle tyres, characterized in that each of said sections substantially lies in a plane parallelly offset relative to a meridian plane of the carcass structure, so that its crown portion is oriented, relative to a radial reference plane passing through a transition point between the crown portion and at least one of the corresponding side portions, at an angle of different value from the inclination of said at least one side portion.

In a preferential solution, each of said sections lies in a plane parallel to said radial reference plane, so that said crown portion substantially lies in said radial reference plane, whereas each side portion of the section itself extends in an inclined direction relative to the radial reference plane itself.

Preferably, each of said sections has a strip-like structure and comprises longitudinal thread-like elements at least partly incorporated into at least one layer of elastomer material.

In a possible embodiment, provision is made for at least one first series and one second series of elongated sections, in which sections belonging to the first and second series respectively lie in offset planes on respectively opposite sides relative to said meridian plane, so that the side portions of the sections of the first series have a crossed orientation relative to the side portions of the sections of the second series.

In a preferential solution, sections belonging to the first series are circumferentially distributed at a pitch at least equal to twice the width of said sections, the sections of the second series being disposed in the spaces existing between the sections of the first series so as to define said at least one carcass ply together with the last mentioned sections.

It is also preferably provided that each of said annular reinforcing structures should comprise at least one first primary portion axially interposed between the side portions of the sections belonging to the first series and second series respectively.

Provision may be also made for the presence of at least one third series of strip-like sections circumferentially distributed at a pitch at least equal to twice the width of the sections themselves, and a fourth series of strip-like sections disposed in the spaces existing between the sections of the third series so as to define, together with the latter, at least one second carcass ply superposed on the first carcass ply formed of the sections of the first and second series.

Preferably, sections belonging to the first and second carcass plies respectively lie in offset planes on respectively opposite sides relative to said meridian plane, so that the side portions of the sections belonging to the first carcass ply have a crossed orientation relative to the side portions of the sections belonging to the second carcass ply.

Advantageously, the side portions of each elongated section belonging to the first and third series respectively are each partly overlapped by a side portion of at least one elongated adjacent section belonging to the second and fourth series respectively, at a stretch included between a radially outer edge of the respective primary portion of the annular reinforcing structure and a transition region between said side portions and crown portions.

In accordance with a further aspect of the invention, each of said annular reinforcing structures comprises: at least one first primary portion axially interposed between the side portions of the sections belonging to the first series and second series respectively; and at least one second primary portion axially interposed between the side portions of the sections belonging to the third and fourth series respectively.

Preferably, each of said annular reinforcing structures further comprises at least one additional portion disposed against the side portions of the elongated sections belonging to the fourth series, on the opposite side relative to the second primary portion of the annular structure itself.

In more detail, it is preferably provided that each of said first and second primary portions of each of said inextensible reinforcing structures should comprise: a circumferentially inextensible annular insert substantially in the form of a crown disposed coaxially with the carcass structure and adjacent to an inner circumferential edge of the carcass plies, said annular insert being formed of at least one elongated element extending in concentric coils; and a filling body of elastomer material having one side joined to the annular anchoring insert.

It is also preferably provided that said additional portion should comprise an additional circumferentially-inextensible annular insert substantially in the form of a crown, made up of at least one elongated element extending in concentric coils and disposed coaxially with the carcass structure at a position disposed axially in side by side relationship with the filling body of the second primary portion of the respective inextensible annular structure.

It is also an object of the invention to provide a tyre for vehicle wheels comprising a carcass structure manufactured as above stated.

BRIEF DESCRIPTION OF THE DRAWINGS

Further features and advantages will become more apparent from the detailed description of a preferred, non-exclusive embodiment, of a method of manufacturing a carcass structure for vehicle wheel tyres and a carcass structure to be obtained by said method, in accordance with the present invention. This description will be taken hereinafter with reference to the accompanying drawings, given by way of non-limiting example, in which:

FIG. 2 is a diagram showing accomplishment of a continuous strip-like element intended for formation of the carcass ply or plies;

FIG. 3 is a cross-section of an embodiment of said strip-like element;

FIG. 4 is a fragmentary perspective view diagrammatically showing the deposition sequence of a first series of strip-like sections for the purpose of forming a first carcass ply of a tyre in accordance with the invention;

FIGS. 8 and 9 is a fragmentary side view showing two successive deposition steps for the strip-like sections belonging to the first series;

FIG. 10 is a fragmentary side view showing the first primary portion of the annular reinforcing structure applied to the side portions of the strip-like sections of the first series;

FIG. 11 shows a starting step of the deposition of a second series of sections, interposed between the sections of the first series and superposed at the ends on the first primary portion of the annular reinforcing structure;

FIG. 12 is a fragmentary side view showing a starting step of the deposition of a third series of sections, superposed on a first carcass ply made up of the sections of the first and second series;

FIG. 13 shows a second primary portion of the annular reinforcing structure applied to the side portions of the sections belonging to the third series;

FIG. 14 shows a starting step of the deposition of a fourth series of sections, interposed between the sections of the third series;

FIG. 15 laterally shows an additional portion of the annular reinforcing structure applied to the side portions of the sections belonging to the fourth series.

DETAILED DESCRIPTION OF THE EXEMPLARY EMBODIMENTS

Figure 1:
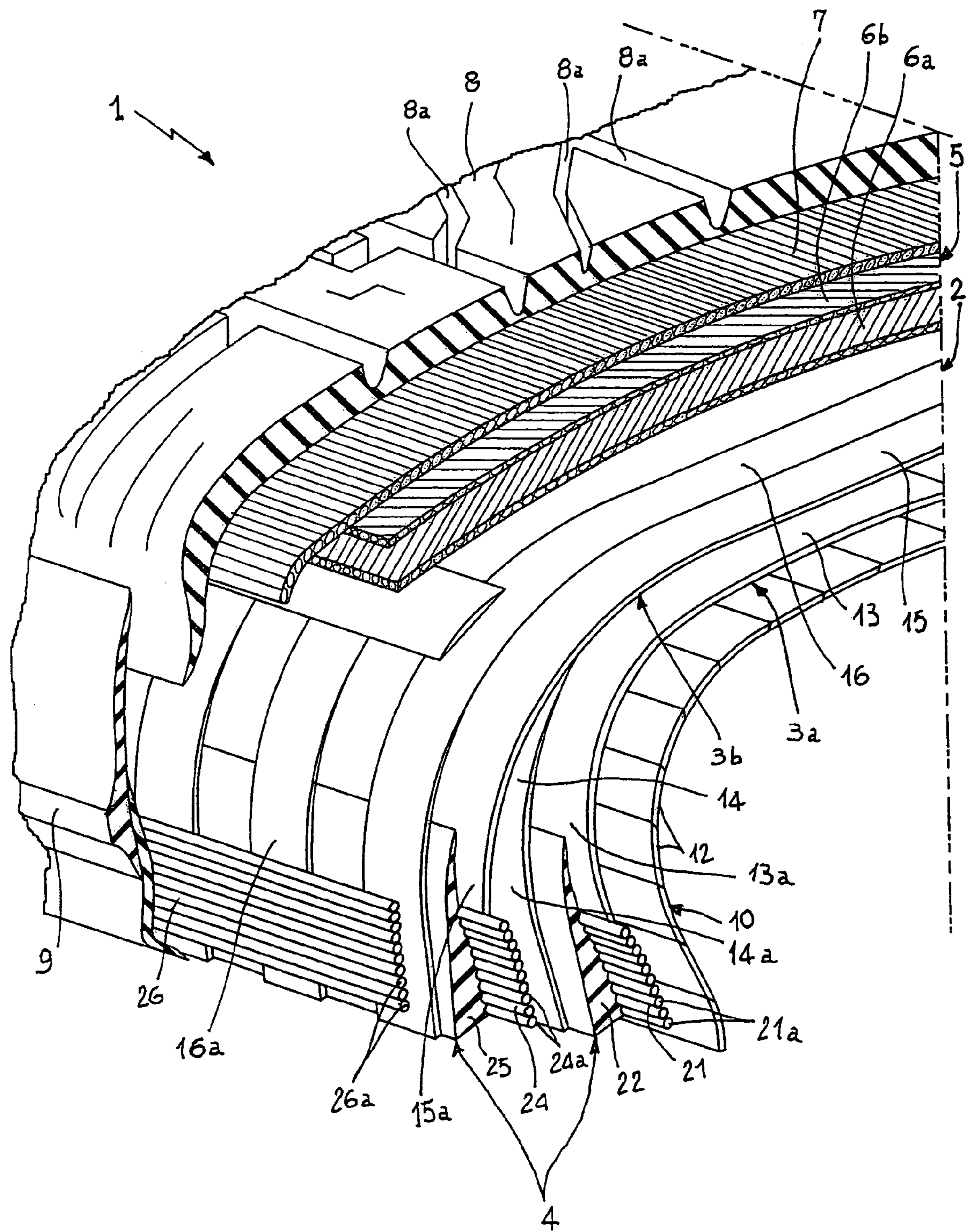
FIG. 1 is a fragmentary split perspective view of a tyre provided with a carcass structure manufactured in accordance with the present invention.
Figure 5:
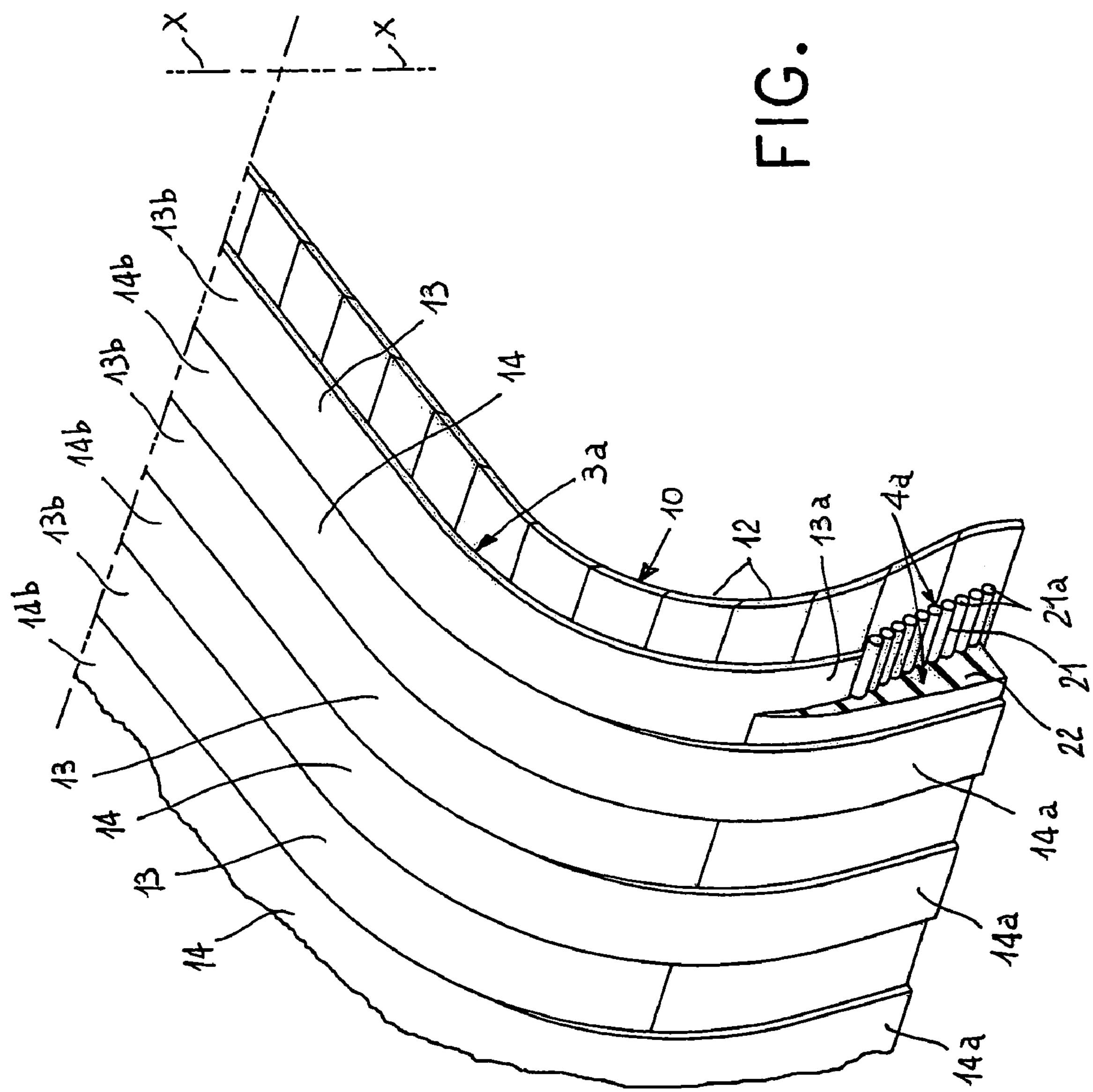
FIG. 5 is a fragmentary perspective view of a first primary portion of the inextensible annular structure axially applied to said side flaps of the strip-like sections belonging to the first series and partly covered with the end flaps of strip-like sections belonging to a second series.
Figure 6:
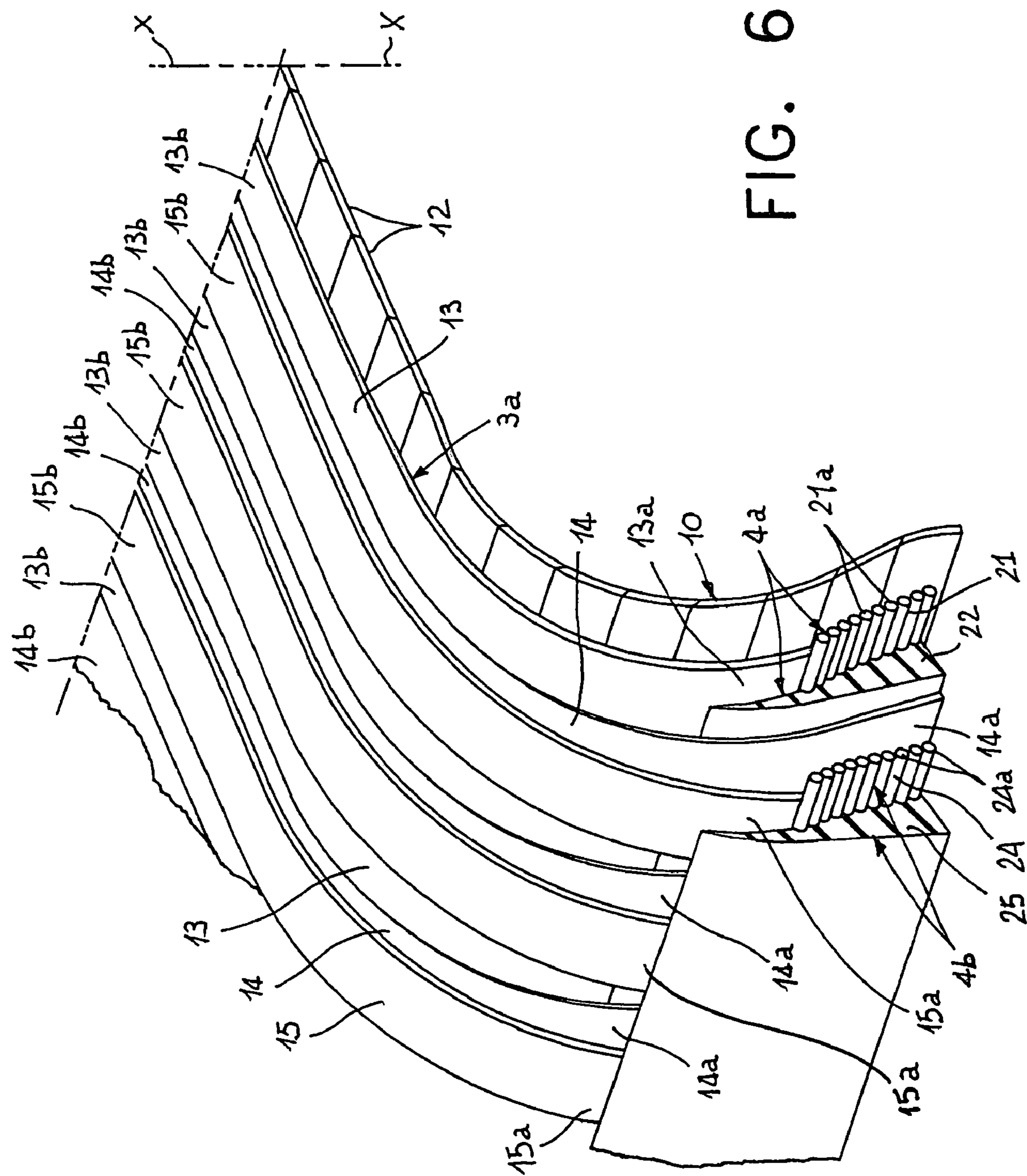
FIG. 6 shows a third series of strip-like sections laid down on the first carcass ply and a second primary portion of the annular reinforcing structure applied to the end flaps of the sections of the third series.

With reference to the drawings, a tyre for vehicle wheels having a carcass structure 2 manufactured by a method in accordance with the present invention has been generally identified by reference numeral 1.

The carcass structure 2 has at least one carcass ply and preferably a first and a second carcass plies 3*a*, 3*b*, having a substantially toroidal conformation and in engagement, by their opposite circumferential edges, with a pair of annular reinforcing structures 4 (only one of them being shown in the drawings), each of which is located, when the tyre has been completed, at the region usually referred to as "tyre bead".

Circumferentially applied to the carcass structure 2 at a radially outer position thereof, is a belt structure 5 comprising one or more belt strips 6*a*, 6*b* and 7. A tread band 8 is circumferentially superposed on the belt structure 5 and longitudinal and transverse cuts 8*a* are formed in said tread band 8, following a moulding operation carried out concurrently with vulcanization of the tyre, and such disposed as to define a desired "tread pattern".

Tyre 1 also comprises a pair of so-called "sidewalls" 9 laterally applied to opposite sides of the carcass structure 2.

The carcass structure 2 may possibly be coated, on its inner walls, with a liner 10 essentially consisting of a layer of air-proof elastomer material, suitable to ensure the hermetic seal of the inflated tyre.

Assembling of the above listed components, as well as production of one or more of said components, takes place with the aid of a toroidal support 11, diagrammatically shown in FIGS. 8 to 11, having the same configuration as the inner walls of the tyre to be manufactured.

The toroidal support 11 may have smaller sizes than those of the finished tyre, by a linear amount preferably included between 2% and 5% measured, just as an indication, along the circumferential extension of the support itself at an equatorial plane X-X thereof which is coincident with the equatorial plane of the tyre.

The toroidal support 11, which is not described or illustrated in detail in that it is not particularly of importance to the aims of the invention, may for example consist of a collapsible drum or an inflatable bladder suitably reinforced, so that it may take and maintain the desired toroidal conformation under inflation conditions.

The foregoing being stated, manufacturing of tyre 1 first involves formation of the carcass structure 2, starting with possible formation of liner 10.

This liner 10 can be advantageously obtained by circumferentially winding around the toroidal support 11 at least one ribbon-like band 12 of an air-proof elastomer material, produced from an extruder and/or a calender located close to the toroidal support itself. As viewed from FIG. 1, winding of the ribbon-like band 12 substantially takes place in circumferential coils consecutively disposed in side by side relationship so as to follow the cross-section outline of the outer surface of the toroidal support 11.

For the purpose of the present description by cross-section outline it is herein intended a configuration exhibited by the half-section of the toroidal support 11 sectioned along a plane radial to a geometric rotation axis "O" thereof (FIG. 8-15) which is coincident with the geometric axis of rotation of the tyre, and therefore of the carcass structure 2 being manufactured.

In accordance with the present invention, the first carcass ply 3*a* is directly formed on the toroidal support 11 by depositing thereon, as better clarified in the following, a first and a second series of elongated sections 13, 14 obtained from at least one continuous elongated element 2*a*. Each elongated section 13, 14 may be made in the form of an individual cord or, as provided in a preferential solution, may advantageously have a strip-like structure in that it is obtained from at least one continuous strip-like element 2*a* (FIGS. 2 and 3) preferably having a width included between 3 mm and 15 mm.

The second carcass ply 3*b* is in turn formed upon the first carcass ply 3*a* by, as better clarified in the following, depositing a third and a fourth series of elongated sections 15, 16 that can be obtained from said continuous strip-like element 2*a* as well.

As viewed from FIG. 2, preparation of the continuous strip-like element 2*a* essentially involves that one or more thread-like elements 17 and preferably three to ten thread-like elements 17, fed from respective reels 17*a*, should be guided through a first extruder 18 associated with a first extrusion apparatus 19 carrying out feeding of raw elastomer material through the extruder itself.

It is pointed out that, for the purpose of the present description, by "extruder" it is intended that part of the extrusion apparatus, also identified in this particular field by the term "extrusion head", provided with a so-called "die" passed through by the product being worked at a corresponding outlet port shaped and sized according to the geometrical and dimensional features to be given to the product itself.

The elastomer material and thread-like elements 17 are intimately joined together within the extruder 18, thereby generating the continuous strip-like element 2*a* at the outlet thereof, which element is formed of at least one layer of elastomer material 20 into the thickness of which the thread-like elements themselves are incorporated.

Depending on requirements, the thread-like elements 17 in the extruder 18 can be guided in such a manner that they are not integrally incorporated into the layer of elastomer material 20, but appear on one or both surfaces thereof.

The thread-like elements 17 may each consist for example of a textile cord preferably having a diameter included between 0.6 mm and 1.2 mm, or a metallic cord preferably having a diameter included between 0.3 mm and 2.7 mm.

Advantageously, if required, the thread-like elements 17 can be disposed in the continuous strip-like element 2*a* in such a manner that they give the carcass ply 3 thus obtained unexpected qualities of compactness and homogeneity. For the purpose, the thread-like elements 17 can be, for example, disposed at a density greater than six thread-like elements per centimeter, measured circumferentially on the carcass ply 3 close to the equatorial plane X-X of tyre 1. In any case, it is preferably provided that the thread-like elements 17 should be disposed in the strip-like element 2*a* at a mutual distance between centers not lower than 1.5 times the diameter of the thread-like elements themselves, so as to enable an appropriate rubberizing operation between respectively adjacent threads.

The continuous strip-like element 2*a* coming out of extruder 18 can be advantageously guided, possibly through a first accumulator-compensator device 19*a*, on a deposition apparatus the structure and operation features of which are described in more detail in the European Patent Application No. 97830731.2 in the name of the same Applicant, contents of which is considered as herein integrally incorporated. This deposition apparatus is adapted to sequentially cut the continuous strip-like element 2*a* into sections 13, 14, 15, 16 of predetermined length.

Cutting of each section 13, 14, 15, and 16 is immediately followed by deposition of same on the toroidal support 11, giving the section a U-shaped configuration around the cross-sectional outline of the toroidal support itself, in such a manner that in sections 13, 14, 15, and 16, two side portions 13*a*, 14*a*, 15*a*, and 16*a* can be identified that radially extend toward the axis of the toroidal support 11, at positions axially spaced apart from each other, and one crown portion 13*b*, 14*b*, 15*b*, and 16*b* that extends at a radially outer position between the side portions.

The toroidal support 11 can be driven in angular rotation with a step-by-step movement in synchronism with operation of said deposition apparatus, in such a manner that the cutting action of each section 13, 14, 15, 16 follows its deposition at a position circumferentially spaced apart from the previously laid down section 13, 14, 15, 16.

In more detail, rotation of the toroidal support 11 takes place at an angular pitch to which a circumferential displacement corresponds which is equal to a multiple of the width of each section 13, 14, 15, 16 or at all events at least twice said width.

It is to point out that, to the aims of the present invention, when not otherwise stated, the term "circumferential" refers to a circumference lying in the equatorial plane X-X and close to the outer surface of the toroidal support 11.

Due to the above described operating sequence, by a first full revolution of the toroidal support 11 around its axis deposition of the first series of strip-like sections 13 takes place, said sections being circumferentially distributed at a circumferential pitch equal to twice the width of each of them. Therefore, as clearly viewed from FIG. 4, an empty space "S" is left between one and the other of the sections belonging to the first series, which space at least at the crown portions 13*b* of the sections themselves has the same width as the latter.

In accordance with the present invention, it is advantageously provided that deposition of each section should not take place, as can be found on the contrary in the known art, in a meridian plane P of the toroidal support 11, i.e. in a plane passing through the geometric axis "O" of the toroidal support itself. As clearly seen in FIGS. 8 to 10, deposition of each section 13 belonging to the first series takes place on the contrary in a first deposition plane N parallelly offset relative to said meridian plane P.

To the aims of the present description by "parallelly offset" it is intended that the deposition plane N, seen in a direction parallel to the geometric axis "O" of the toroidal support 11 as in FIGS. 8 to 15, is substantially parallel to the meridian plane P or in any case does not converge on the geometric axis of the toroidal support itself, at least at the intersection between the equatorial plane X-X and the geometric axis. This does not prevent the deposition plane of each section from being also inclined to the meridian plane P, when seen from a direction radial to the geometric axis "O", to give the crown portions a desired inclination relative to a direction parallel to the geometric axis itself.

However, in a preferential embodiments it is provided for the first deposition plane N to be parallel to the meridian plane P, which means that it is parallel even when seen from a radial direction relative to the geometric axis "O". By so doing, deposition of each section 13 takes place in such a manner that its crown portion 13*b*, and more particularly each thread-like element arranged in said crown portion, substantially lies in a plane radial to the geometric axis "O", whereas the side portions 13*a* each extend in a direction inclined at a given angle "α" relative to a reference plane R radial to the geometric axis "O" and passing through the transition point between the crown portion 13*b* and the side portions themselves (see FIG. 8).

Opening of angle "α" can be easily controlled by suitably adjusting distance "d" (see FIG. 9) existing between the first deposition plane N and the meridian plane P. It is therefore possible to obtain any desired value of angle "α" formed by the side portions 13*a* without affecting orientation of the crown portions 13*b*.

If the crown portions 13*b* are desired to be disposed at some inclination relative to a circumferential extension direction, the toroidal support 11 and/or the deposition apparatus may be such oriented that the first deposition plane N, when seen from a direction radial to the geometric axis "O", is suitably inclined to the meridian plane P. As in the previously described case, due to offsetting between the deposition plane N and the meridian plane P, the crown portion 13*b* of each section 13, relative to each of the two radial planes P' passing through the transition points between the crown portion itself and the respective side portions 13*a*, will form an angle of different value than the inclination angle "α" formed by the side portion itself. By suitably adjusting distance "d" between the deposition plane N and the meridian plane P, opening of the inclination angle "α" of the side portions 13*a* will be able to be varied depending on requirements, without the orientation of the crown portions 13*b* being submitted to any change.

When deposition of the first series of sections 13 has been completed over the whole circumferential extension of the toroidal support 11, accomplishment of the carcass structure 2 goes on with the step of applying first primary portions 4*a* of said annular inextensible structures 4, to a region close to each of the inner circumferential edges of the carcass ply 3 being manufactured (see FIG. 10) for the purpose of obtaining the carcass regions, known as "beads", above all intended for ensuring anchoring of the tyre to a corresponding mounting rim.

Each of said first primary portions 4*a* comprises at least one first circumferentially inextensible annular insert 21, substantially shaped in the form of a crown concentric with the geometric axis of rotation of the toroidal support 11 and placed to a circumferentially inner position against the side portions 13*a* exhibited by the strip-like sections 13 belonging to the first series.

The first annular insert 21 is preferably made up of at least one elongated metal element wound up in several substantially concentric coils 21*a*. Coils 21*a* can be defined either by a continuous spiral or by concentric rings formed of respective elongated elements.

Combined with the first annular insert 21 is a first filling body 22 of elastomer material, preferably of the thermoplastic type, having a hardness included between 48° and 55° Shore D, measured at a temperature of 23° C. and preferably having a radial extension greater than the radial extension of the first annular insert 21.

In accordance with a preferential solution, the first annular insert 21 is made directly against the side portions 13*a* of sections 13 and forms coils 21*a* by winding up the thread-like element possibly with the aid of rollers or other suitable means acting against the surface of the toroidal support 11.

Due to the sticky character of the elastomer layer 20 coating sections 13 belonging to the first series, as well as of the possible liner 10 previously laid down on the drum itself, a steady positioning of the individual coils 21 is ensured during the forming step.

Subsequently, the first filling body 22 can be in turn directly formed against the first annular insert 21 by application, for example, of a continuous strip of elastomer material coming out of an extruder located close to drum 11. The continuous strip may have the final conformation in section of the first filling body 22 already on its coming out of the respective extruder. Alternatively, the continuous strip will have a reduced section relative to that of the filling body, and the latter will be obtained by applying the strip itself in several coils disposed in side by side relationship and/or superposed, to define the first filling body 22 in its final configuration.

After application of the first primary portions 4*a* of the annular reinforcing structures 4, formation of the first carcass ply 3*a* is completed by deposition of the second series of sections 14 which are obtained through cutting of the continuous strip-like element 2*a* to size and are applied to the toroidal drum 11 in the same manner as said with reference to sections 13 belonging to the first series.

As clearly shown in FIGS. 5 to 11, each section 14 belonging to the second series is laid down in a U-shaped conformation around the cross-section outline of the toroidal support 11, between two consecutive sections 13 belonging to the first series and preferably according to an orientation parallel to the latter ones. In more detail, each section 14 belonging to the second series has the respective crown portion 14*b* circumferentially interposed between the crown portions 13*a* of sections 13 belonging to the first series, so as to fill the space "S" existing between them and a pair of side portions 14*a* carrying the end flaps of the section itself in superposed relationship with the respective first primary portions 4*a* of the annular reinforcing structures 4, at axially opposite positions relative to the end flaps of sections 13 belonging to the first series.

It may be also provided for the side portions 14*a* of each section 14 belonging to the second series to partly overlap the side portions 13*a* of two consecutive sections 13 belonging to the first series, each at a stretch included between the radially outer edge of the respective primary portion 4*a* and the transition region between the side portion itself and the crown portion 13*b*, 14*b*.

Due to a mutual convergence between the contiguous side portions 13*a*, 14*a*, radially oriented relative to the geometric axis of the toroidal support 11, overlapping or covering of the side portions 13*a* of sections 13 belonging to the first series, i.e. the circumferential amplitude of the overlapping regions, progressively decreases starting from a maximum value, measured close to the radially outer edge of the first primary portion 4*a* of each annular reinforcing structure 4, until a zero value at the transition region between the side portions 13*a*, 14*a* and the crown portions 13*b*, 14*b*.

After carrying out deposition of sections 14 belonging to the second series in the above described manner, formation of the second carcass ply 3*b* is started by deposition of the third series of sections 15.

Also sections 15 belonging to the third series are laid down in a U-shaped configuration around the cross-section outline of the first carcass ply 3*a*, and at a circumferential pitch which is equal to a multiple of their width, or at all events at least twice said width, substantially in the same manner as described with reference to deposition of sections 13, 14 belonging to the first and second series or in a similar manner.

As clearly shown in FIG. 12, in a convenient solution sections 15 belonging to the third series are laid down in a second deposition plane N' which is offset on the opposite side from the first deposition plane N, relative to the meridian plane P.

By so doing, sections 15 of the third series will have their crown portions 15*b* parallelly disposed in a superposition relationship with the crown portions of sections 13, 14 belonging to the first and/or second series. In turn, each side portion 15*a* of sections 15 belonging to the third series will be inclined at an angle "α'" with respect to the radial reference plane R' passing through the transition point between the side portions and the respective crown portion 15*b*, with a crossed orientation relative to the side portions 13*a*, 14*a* of the sections belonging to the first and second series.

Then application of second primary portions 4*b* of the annular reinforcing structures 4 to the end flaps of sections 15 belonging to the third series is carried out, at axially opposite positions relative to the above mentioned first primary portions 4*a*.

As viewed from the accompanying figures, each of the second primary portions is preferably structured in the same manner as described with reference to the first primary portions 4*a*.

In particular, each second primary portion 4*b* has a respective second circumferentially-inextensible annular insert 24 formed of at least one respective elongated element disposed in concentric coils 24*a*, so as to form a crown disposed coaxially with the carcass structure 2 and close to the inner circumferential edges of the carcass plies 3*a*, 3*b*.

Combined with the second annular insert 24, disposed against the end flaps of sections 14, 15 belonging to the second and third series, is a second filling body 25 of elastomer material, shaped in the same manner as the first filling body 22.

Accomplishment and application of the second annular insert 24 and the second filling body 25, as well as of the second primary portion 4*b* taken as a whole, can take place in the same manner as above described with reference to the first primary portion 4*a*.

Then formation of the second carcass ply 3*b* is completed by depositing the fourth series of sections 16 in the second deposition plane N', each inserted between two sections 15 belonging to the third series and overlapping the second primary portions 4*b* by their side portions 14*a*, at an axially opposite position relative to the side portions of sections 14 and 15 belonging to the second and third series, respectively.

In accordance with a preferential embodiment of the invention, after deposition of sections 16 belonging to the fourth series has been carried out, formation of the annular reinforcing structures 4 at the beads is completed.

Figure 7:
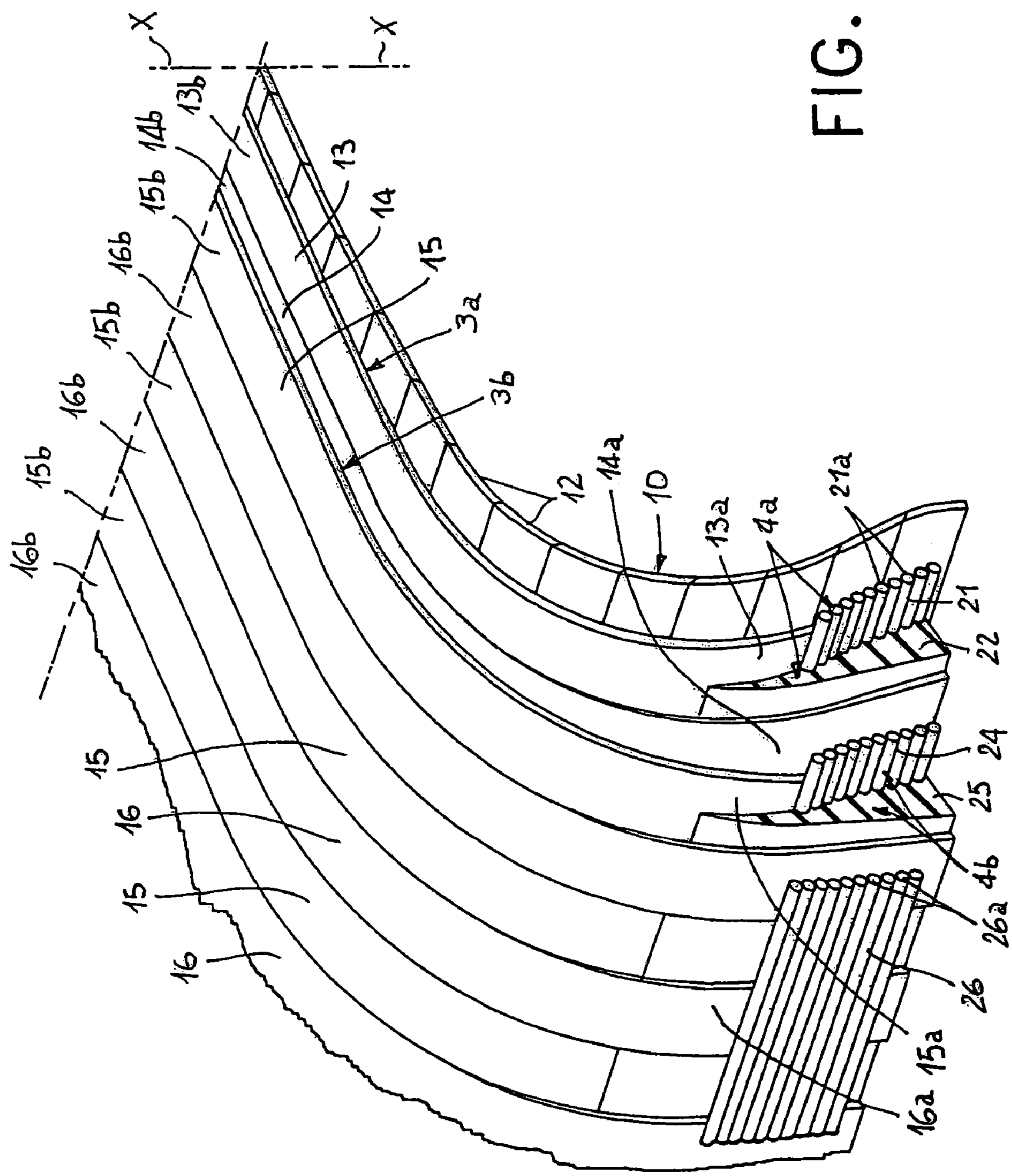
FIG. 7 shows a fourth series of strip-like sections alternated with the strip-like sections of the third series and an additional portion of the annular reinforcing structure applied to the end flaps of the sections of the fourth series.

For the purpose, as seen in FIGS. 7 and 15, for each of the annular reinforcing structures 4 application of an additional portion 26 is provided against the end flaps of sections 16 belonging to the fourth series.

Preferably, each additional portion 26 is essentially made up of at least one additional crown-shaped annular insert. This additional annular insert 26 can be, for example, obtained by winding up, in several coils 26*a* disposed in side-by-side relationship in a radial direction, a respective elongated element directly against the second carcass ply 3*b* previously formed on the toroidal support 11, so as to form the second annular insert 26 directly in contact with the carcass ply itself.

Following this operation, each of the side portions of sections 16 belonging to the fourth series is advantageously enclosed between the second primary portion 4*b* and the additional portion 26 of the respective annular reinforcing structure 4.

In tyres of the radial type, a belt structure 5 is usually applied to the carcass structure 2.

This belt structure 5 may be made in any manner convenient for a person skilled in the art and in the example shown it essentially comprises a first and a second belt strips 6*a*, 6*b* having cords with a respectively crossed orientation. Superposed on belt strips 6*a*, 6*b* is an auxiliary belt strip 7, for instance obtained by arranging around the belt strips, at least one continuous cord wound up in substantially circumferential coils axially disposed in side by side relationship.

Then a tread band 8 is applied to the belt structure 5, whereas applied to the side portions of the carcass structure 2 are sidewalls 9 which too can be obtained in any manner convenient for a person skilled in the art.

Embodiments of a belt structure, sidewalls and a tread band that can be advantageously adopted for full accomplishment of tyre 1 on the toroidal support 11 are disclosed in the European Patent Application No. 97830632.2 in the name of the same Applicant.

Tyre 1 thus manufactured can be now submitted, possibly after removal from support 11, to a vulcanization step that can be carried out in any known and conventional manner.

The present invention achieves important advantages.

In fact the carcass structure in reference can be obtained directly on a toroidal support on which the whole tyre can be advantageously manufactured. Thus all problems connected with manufacture, storage and management of semifinished products which are common to manufacturing processes of traditional conception are eliminated.

As compared with the method described in U.S. Pat. No. 5,362,343, the manufacturing times for the carcass ply can be greatly reduced due to the simultaneous deposition of as many thread-like elements as there are contained in each section 13, 14 or in the continuous strip-like element 2*a* from which sections 13, 14 come. Employment of sections 13, 14 also dispenses with the need for previously depositing liner 10 on the toroidal support 11. In fact, the elastomer layer 20 employed in forming the continuous strip-like element 2*a* is by itself able to ensure an efficient adhesion of said element to the toroidal support 11, thereby ensuring a steady positioning of the individual sections 13, 14.

Accuracy in positioning of sections 13, 14 and of the thread-like elements integrated therein to is further improved by the fact that each section has an important structural consistency that makes it insensitive to vibrations or similar oscillation effects which can be transmitted by the deposition apparatus. In this connection it is to note that deposition of individual cords, as described in U.S. Pat. No. 5,362,343, may be somewhat problematic, due exactly to vibrations and/or oscillations to which said cords are submitted during the deposition step.

Furthermore, simultaneous deposition of a plurality of thread-like elements in accordance with the invention enables the deposition apparatus to be operated at slower rates than required when deposition of individual cords is concerned, which is a further advantage in terms of accuracy in working without on the other hand impairing productivity.

Besides, deposition of strip-like sections directly crown wise to a toroidal support of an outline substantially identical with that of the finished tyre enables densities to be achieved that cannot be reached with the known methods of the art contemplating deposition of a carcass ply in the form of a cylindrical sleeve and subsequent shaping of same into a toroidal form, with consequent thinning out of the carcass ply cords disposed crown wise to the finished tyre.

In addition to the above, each strip-like section can be steadily fastened to the toroidal support by a vacuum effect produced through possible suction ducts, which steady fastening by vacuum cannot be achieved by known processes carrying out deposition of individual cords.

The construction and structure conception of the subject tyre, above all with reference to its carcass structure 2, enables important improvements to be reached in terms of performance and structural strength.

In particular, deposition of the elongated sections in planes which are offset relative to the meridian plane of the toroidal support enables the crown portions of the individual sections to be given a different inclination from that of the side portions.

Thus a tyre can be obtained in which the thread-like elements forming the carcass plies have a radial orientation at the crown regions of the tyre, whereas at the sidewalls the inclination of the thread-like elements has respectively crossed orientations between a carcass ply and the other.

A tyre provided with such a carcass structure, due to the radial orientation of the thread-like elements of the carcass plies at the crown region, will have excellent longitudinal-flexibility qualities (resulting in an efficient absorption of road unevennesses) and stability in steering.

The mutually crossed orientation of the thread-like elements at the sidewall and bead regions, in turn, gives an excellent structural strength, in particular with reference to torsional stresses caused during the acceleration and braking steps, as well as in connection with resistance to slip thrusts.

This aspect is particularly advantageous with reference to low-profile tyres for high and very high performance, where the structural strength of the sidewalls represents an important critical character also due to the high torque values that the tyre must be able to transmit.

It is also to note that achievement of the technical effects of the invention is not subordinated to the formation of the carcass plies by means of strip-like elements. In fact the invention lends itself to be put into practice also on carcass structures the plies of which are made by deposition of individual cords.

It is further to note that accomplishment of the carcass structure may also involve either formation of a single carcass ply, by two series of elongated sections disposed in offset planes on respectively opposite sides, or formation of two carcass plies made up of a first and a second series of elongated elements respectively, disposed in offset planes on respectively opposite sides with reference to a meridian plane.

It is also to note that the construction features of the inextensible annular structures 4 and the modalities according to which they are integrated into the carcass plies are able to further increase the structural strength of tyre 1 at the bead and sidewall regions, where a greater structural strength is usually required, above all in relation to the effects caused by slip thrusts.

In fact, the presence of the circumferentially inextensible annular inserts 21, 24, 26 intimately joined to the carcass plies 3*a*, 3*b* furnishes an excellent "link" with the thread-like elements 17 belonging to the different series of sections 13, 14, 15, 16. Thus the carcass structure 2 is further strengthened at the regions corresponding to the tyre 1 beads without requiring, for the purpose, use of additional strip-like inserts called "flippers" wound like a slipknot around the annular reinforcing structures 4, to which resort is made, on the contrary, in the known art.

The construction conception of the annular reinforcing structures 4 in fact is capable of preventing the tyre beads from being deformed under the effect of slip thrusts or carrying out a rotation by pivoting on their rest points against the respective seats arranged in the wheel rim.

In particular it is to note that the presence of the first insert 21, the second insert 24 and the auxiliary insert 26, located directly in contact with the end flaps of the sections, efficiently hinders a tendency of the tyre bead to bend and rotate under the effect of slip thrusts.

Under this point of view, the behaviour of the annular reinforcing structure 4 is substantially similar to that of a reinforcing structure as disclosed in the European Patent Application No. 97830731.2 in the name of the same Applicant, to which please refer for further details.

It is also to note that the annular inserts 21, 24 and 26 supply a further structural protection for the tyre at the beads.

The invention claimed is:

1. A tyre for a vehicle wheel, comprising:
- a carcass structure;
- a belt structure applied to the carcass structure at a circumferentially outer position of the carcass structure;
- a tread band applied to the belt structure at a circumferentially outer position of the belt structure; and
- at least one pair of sidewalls applied to the carcass structure at laterally opposite positions;
- wherein the carcass structure comprises:
  - at least one first carcass ply; and
  - at least two annular reinforcing structures;
- wherein the at least one first carcass ply comprises elongated sections circumferentially distributed around a geometric rotation axis of the tyre,
- wherein each elongated section extends in a U-shaped configuration around a cross-section outline of the carcass structure to define two side portions and one crown portion,
- wherein the side portions are mutually spaced apart in an axial direction of the carcass structure,
- wherein the crown portion extends at a radially outer position between the side portions,
- wherein the at least two annular reinforcing structures are configured to anchor the tyre to a rim and are disposed close to respective inner circumferential edges of the at least one first carcass ply,
- wherein each elongated section substantially lies in a plane parallelly offset relative to a meridian plane of the carcass structure, and
- wherein the crown portion of each elongated section is oriented, relative to a radial reference plane passing through a transition region between the crown portion and at least one corresponding side portion, at an angle having a different value from an inclination of the at least one corresponding side portion.

2. The tyre of claim 1, wherein each of the elongated sections lies in a plane parallel to the radial reference plane,
- wherein the crown portion of the elongated sections substantially lies in the radial reference plane, and wherein each side portion of the elongated sections extends in an inclined direction relative to the radial reference plane.

3. The tyre of claim 1, wherein each of the elongated sections comprises a strip structure, and wherein each of the elongated sections comprises longitudinal thread elements at least partly incorporated into at least one layer of elastomer material.

4. The tyre of claim 1, further comprising:

at least one first series of elongated sections; and at least one second series of elongated sections;

wherein the elongated sections of the at least one first series and the elongated sections of the at least one second series lie in offset planes on respectively opposite sides relative to the meridian plane of the carcass structure, and wherein the side portions of the elongated sections of the at least one first series have a crossed orientation relative to the side portions of the elongated sections of the at least one second series.

5. The tyre of claim 1, further comprising:

at least one first series of elongated sections; and at least one second series of elongated sections;

wherein the elongated sections of the at least one first series are circumferentially distributed at a pitch at least equal to twice a width of the elongated sections of the at least one first series, and wherein the elongated sections of the at least one second series are disposed in spaces existing between the elongated sections of the at least one first series to define, together with the elongated sections of the at least one first series, the at least one first carcass ply.

6. The tyre of claim 5, wherein each of the annular reinforcing structures comprises at least one first primary portion axially interposed between the side portions of the elongated sections of the at least one first series and the side portions of the elongated sections of the at least one second series.

7. The tyre of claim 5, further comprising:

at least one third series of elongated sections; and a fourth series of elongated sections;

wherein the elongated sections of the at least one third series are circumferentially distributed at a pitch at least equal to twice a width of the elongated sections of the at least one third series, wherein the elongated sections of the fourth series are disposed in spaces existing between the elongated sections of the at least one third series to define, together with the elongated sections of the at least one third series, at least one second carcass ply, and wherein the at least one second carcass ply is superposed on the at least one first carcass ply.

8. The tyre of claim 7, wherein the elongated sections of the at least one first carcass ply and the elongated sections of the at least one second carcass ply lie in offset planes on respectively opposite sides relative to the meridian plane of the carcass structure, and wherein the side portions of the elongated sections of the at least one first carcass ply have a crossed orientation relative to the side portions of the elongated sections of the at least one second carcass ply.

9. The tyre of claim 7, wherein each of the annular reinforcing structures comprises:

at least one first primary portion; and at least one second primary portion;

wherein the at least one first primary portion is axially interposed between the side portions of the elongated sections of the at least one first series and the side portions of the elongated sections of the at least one second series; and wherein the at least one second primary portion is axially interposed between the side portions of the elongated sections of the at least one third series and the side portions of the elongated sections of the fourth series.

10. The tyre of claim 9, wherein each of the annular reinforcing structures further comprises at least one additional portion disposed against the side portions of the elongated sections of the fourth series on an opposite side relative to the at least one second primary portion of the annular reinforcing structure.

11. The tyre of claim 7, wherein the side portions of each elongated section of the at least one first series are partly overlapped by side portions of at least one adjacent elongated section of the at least one second series at a stretch included between a radially outer edge of a respective primary portion of the annular reinforcing structures and transition regions between the side portions and the crown portion, and wherein the side portions of each elongated section of the at least one third series are partly overlapped by side portions of at least one adjacent elongated section of the fourth series at a stretch included between a radially outer edge of a respective primary portion of the annular reinforcing structures and transition regions between the side portions and the crown portion.

12. The tyre of claim 9, wherein the at least one first primary portion of the annular reinforcing structures comprises:

a first annular anchoring insert; and a first filling body;

wherein the first annular anchoring insert is substantially in a form of a crown disposed coaxially with the carcass structure and adjacent to an inner circumferential edge of the at least one first carcass ply, wherein the first annular anchoring insert is formed of at least one first elongated element extending in concentric coils, and wherein the first filling body of elastomer material has one side joined to the first annular anchoring insert, and wherein the at least one second primary portion of the annular reinforcing structures comprises:

a second annular anchoring insert; and a second filling body;

wherein the second annular anchoring insert is substantially in a form of a crown disposed coaxially with the carcass structure and adjacent to an inner circumferential edge of the at least one second carcass ply, wherein the second annular anchoring insert is formed of at least one second elongated element extending in concentric coils, and wherein the second filling body of elastomer material has one side joined to the second annular anchoring insert.

13. The tyre of claim 10, wherein the at least one additional portion comprises an additional annular insert, wherein the additional annular insert is substantially in a form of a crown formed of at least one additional elongated element, wherein the at least one additional elongated element extends in concentric coils, and wherein the at least one additional elongated element is disposed coaxially with the carcass structure at a position disposed axially in side-by-side relationship with a filling body of the at least one second primary portion of a respective annular reinforcing structure.

* * * * *